Sept. 6, 1955     F. FIELDEN ET AL     2,717,124
ROLLER MILL WITH PNEUMATIC DISCHARGE-MATERIAL CONVEYOR
Filed Nov. 21, 1951     2 Sheets-Sheet 1
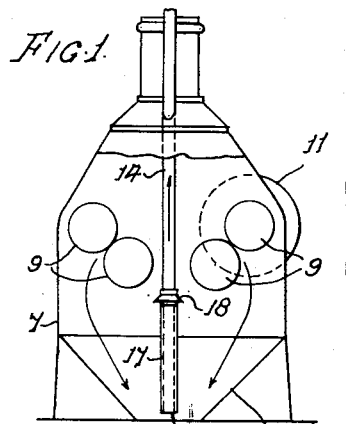
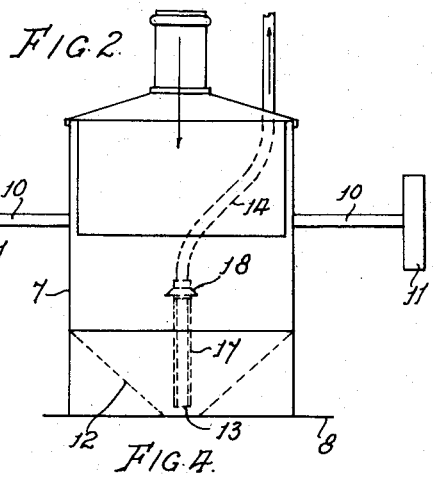
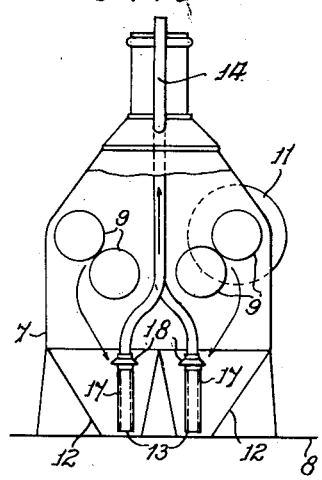
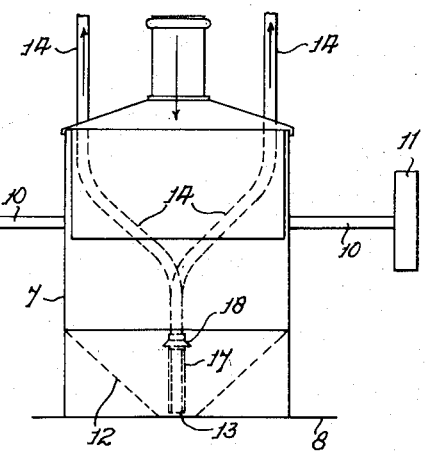
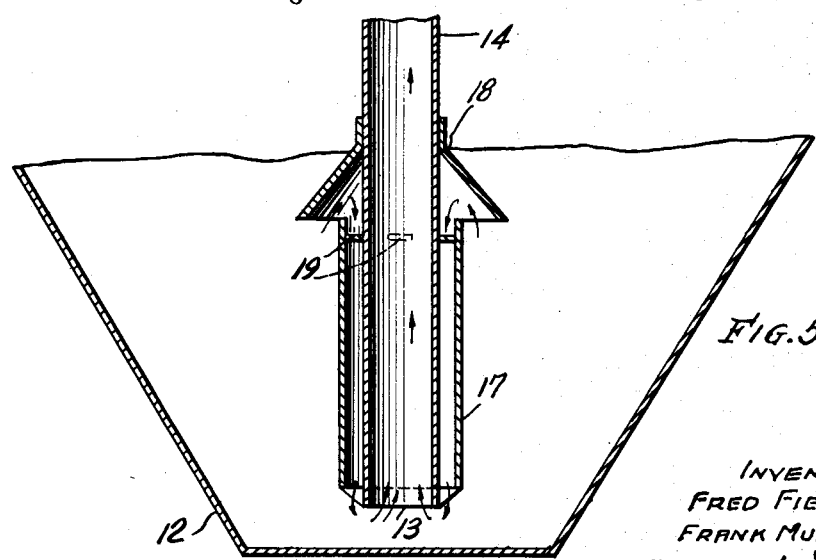
INVENTORS.
FRED FIELDEN
FRANK MURPHY.
BY Francis E. Boyce
ATTORNEY.

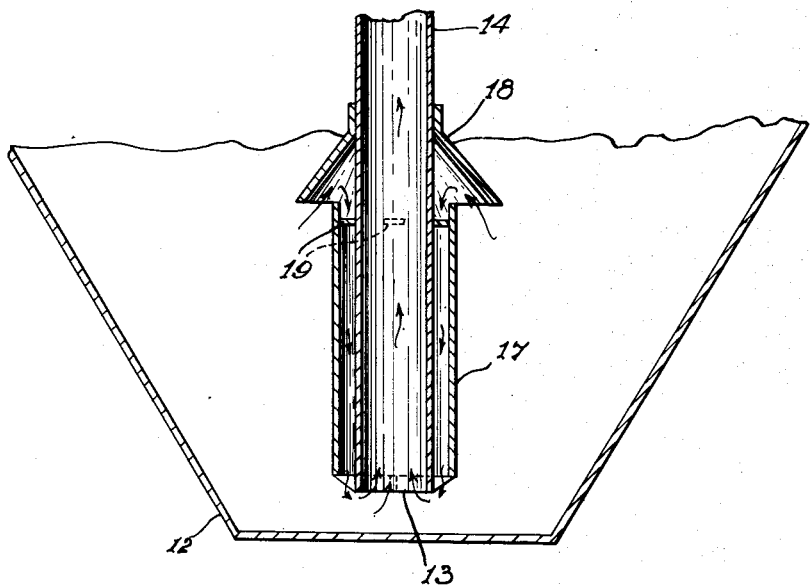

United States Patent Office 2,717,124
Patented Sept. 6, 1955

2,717,124

ROLLER MILL WITH PNEUMATIC DISCHARGE-MATERIAL CONVEYOR

Fred Fielden and Frank Murphy, Rochdale, England, assignors to Thomas Robinson & Son Limited, Rochdale, England Application November 21, 1951, Serial No. 257,455

3 Claims. (Cl. 241—60)

This invention has reference to grain milling machinery and has for its object to provide an improved construction of roller mill.

In roller mills as at present constructed, the roller mill is often divided into compartments by divisions, and rolls are mounted near the top and above a hopper or hoppers into which the stock falls or is projected after it leaves the rolls. These hoppers are usually of the shape of an inverted pyramid and the stock passes out through an opening in the inverted apex and is conveyed away and lifted to the desired height for the next operation.

This construction of a roller mill requires that, as the stock passes out of the hopper at the bottom, there must be some passage or receptacle below the hopper bottom to receive the falling stock and such a passage or receptacle is often in the form of a tube or pipe of a pneumatic conveying system.

In one known construction where a pneumatic conveying system is used, the pipe passes downward from the hopper bottom, through the floor on which the roller mill stands, passes horizontally under the floor and then up through the floor. In another known construction the stock falls into a pipe passing through the floor to a junction with the vertical pipe up which it is carried by the air current.

In both these constructions the stock has to fall to a level below the hopper bottom, and unless the roller mill is raised a very inconvenient distance above the floor which would make it inaccessible for practical purposes the pipes, and hence the stock, must pass through the floor and into the storey below which means, in effect, that a roller mill and its attached conveying system, occupies parts of two storeys.

This is a disadvantage, as it adds to the cost of a mill building, but there is another disadvantage in that there is a danger of blocks occurring in the downcoming pipes from the hopper, and where a horizontal pipe is used under the floor and there is no gravity fall to assist the movement of the stock, it is still more likely to block and requires a higher suction to convey the stock along it.

The present invention has for its object to provide a roller mill which minimises the disadvantages referred to and provides a roller mill which can be installed substantially on one floor whereon it stands, which may be the basement and in which less power is required for the pneumatic conveying system than in either of the two-storey constructions already referred to, and which has other advantages in construction and operation.

According to this invention a roller mill is provided with a hopper which has no opening in its bottom or walls through which the stock can fall, but has below the rolls an opening or openings to an upwardly directed suction pipe of a conveying system passing either within the framework of the roller mill or on the outside thereof by which stock delivered from the rolls is sucked upwardly by pneumatic action at any convenient position below the rolls and above the hopper bottom, the roller mill and suction pipes constituting almost any construction.

In the accompanying drawings:

Figures 1 and 2 are schematic views at right angles to each other, showing one embodiment of mill and the intake piping of the suction system;

Figures 3 and 4 are similar views showing another embodiment; and

Figure 5 is a sectional view on an enlarged scale of the lower part of one of the hoppers forming part of the mill and illustrating the details of a nozzle construction suitable for use with such hoppers.

In the drawings the structure or body of the roller mill 7 is shown standing on a floor 8, and in Figs. 1 and 3, the rolls 9 are shown the top rolls being secured on the shafts 10 which are driven by any suitable means, such as from the pulleys 11.

Below the rolls 9 are the hoppers 12. In Figs. 1 and 2 both sets of rolls 9 work over a single hopper but in Figs. 3 and 4 each set works over its own hopper.

The hoppers are closed at the bottom and are without the usual outlet, and the inclined sides direct the stock toward the bottom end of a suction nozzle 13 (shown in detail in Fig. 5) on an upwardly directed suction pipe 14 in a pneumatic system, by which the stock fallen from the rolls is lifted to the stage above.

In Figs. 1 to 4 the suction pipe 14 is within the casing of the roller mill, but the pipes 14 at the top of the roller mill are connected to pipes in the system external to the roller mill, but this does not prevent the roller mill from being constructed as a unit with the pipes and nozzles inside.

As shown in Fig. 5, the nozzles 13 are provided with top air inlets to prevent any tendency there may be for the stock to pile up at any time and block the opening to the nozzles. For this purpose each nozzle is enclosed within a tube 17 which is separated from said nozzle and supported thereon by spacing members 19, thereby forming an annular passage around the nozzle. A cowl 18 is supported on the pipe 14 above the top end of said tube 17 and serves to deflect any excess of ground stock that may have collected in the hopper and cause such stock to follow the current of air created by the suction nozzle, as indicated by the arrows in Figure 5. It is to be understood, however, that this particular construction is not considered material to the invention as various other devices to attain the same end may be used.

The suction is in an upward direction so that the stock is sucked upward into the pipe either when it reaches the deposit point, or as it falls from the rolls, or both, for the suction draws the stock to the pipe and much of it may never rest at the deposit point and may even be drawn to that point by the suction tending to pull it upward inside the pipe.

If desired, the bottom of the hopper in each case may be in the form of a curved plate or cone adapted to direct the ground stock toward the intake end of the suction nozzle. In such a construction the bottom plate or cone need not be so far below the hopper as at present, the object to be considered being to prevent adherence of the ground stock to the bottom of the hopper and to remove said stock as promptly as possible after it has left the rolls.

I claim:

1. A rolling mill comprising a casing having an opening at the top for the stock to enter, pairs of rollers mounted for rotation inside said casing, one roller of each pair being positively driven, a hopper inside said casing and located below said pairs of rollers to receive stock falling from the rollers, and an upwardly directed suction pipe intermediate said pairs of rollers with its lower end terminating in a suction nozzle whose inlet is in communication with the hopper at a point near to but above the bottom of said hopper, said suction pipe having a bend therein to avoid fouling the said stock opening as it passes through the top of the casing.

2. A rolling mill comprising a casing having an opening at the top for the stock to enter, pairs of rollers mounted for rotation inside said casing, one roller of each pair being positively driven, a hopper inside said casing and located below said pairs of rollers to receive stock falling from the rollers, said hopper having sides inclined towards the center of the casing, an upwardly directed suction pipe entering said casing through the top and being bent within said casing so as to pass between said pairs of rollers and terminating at its lower end in a suction nozzle extending into the hopper and opening at a point near to but above the bottom of said hopper, said nozzle comprising an annular tubular casing surrounding the lower end of said pipe to allow ambient air to pass down between the casing and pipe, and a cowl attached to said pipe and clear of the casing to prevent stock falling between said casing and pipe to restrict the air flow.

3. A rolling mill comprising a casing having an opening at the top for the stock to enter, two pairs of rollers rotatably mounted in said casing, one roller of each pair being positively driven, a hopper within said casing located below each pair of rollers to receive stock passing through the nip thereof, said hopper having sides inclined towards the center, two upwardly directed suction pipes entering said casing through the top one on either side of the stock opening, said pipes being bent towards each other so as to pass between said pairs of rollers and then bent outwardly so that the lower end of each pipe depends into one of the hoppers, a suction nozzle at the lower end of each pipe terminating at a point near but above the bottom of said hopper, each nozzle comprising an annular tubular casing surrounding the lower end of the pipe to allow ambient air to pass between said pipe and casing, and a cowl attached to the said pipe and clear of the top of the casing to prevent stock falling between said pipe and casing to restrict the air flow to the lower end of the suction pipe.

References Cited in the file of this patent

UNITED STATES PATENTS

| | | |
|---|---|---|
| 219,019 | Renard et al. | Aug. 26, 1879 |
| 297,757 | Case | Apr. 29, 1884 |
| 297,890 | Welch | Apr. 29, 1884 |
| 462,539 | Duckman | Nov. 3, 1891 |
| 850,639 | Gebhardt | Apr. 16, 1907 |
| 2,342,871 | Larman | Feb. 29, 1944 |
| 2,639,862 | Watts | May 26, 1953 |